US009557818B2

(12) United States Patent
Zhai et al.

(10) Patent No.: US 9,557,818 B2
(45) Date of Patent: Jan. 31, 2017

(54) CONTEXTUALLY-SPECIFIC AUTOMATIC SEPARATORS

(71) Applicant: Google Inc., Mountain View, CA (US)

(72) Inventors: Shumin Zhai, Los Altos, CA (US); Kurt Edward Partridge, Palo Alto, CA (US); Xiaojun Bi, Sunnyvale, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 360 days.

(21) Appl. No.: 13/784,507

(22) Filed: Mar. 4, 2013

(65) Prior Publication Data
US 2014/0108990 A1    Apr. 17, 2014

Related U.S. Application Data

(60) Provisional application No. 61/714,682, filed on Oct. 16, 2012.

(51) Int. Cl.
*G06F 3/048*    (2013.01)
*G06F 3/01*    (2006.01)
(Continued)

(52) U.S. Cl.
CPC .............. *G06F 3/017* (2013.01); *G06F 3/0237* (2013.01); *G06F 3/04883* (2013.01); *G06F 3/04886* (2013.01)

(58) Field of Classification Search
CPC .......................... G06F 3/04886; G06F 3/0237
See application file for complete search history.

(56) References Cited

U.S. PATENT DOCUMENTS 5,953,541 A * 9/1999 King .................. G06F 3/0238
710/67
6,011,554 A * 1/2000 King .................. G06F 3/0219
345/168
(Continued)

FOREIGN PATENT DOCUMENTS

| CN | 101071397 A | 11/2007 |
| CN | 102236422 A | 11/2011 |
| CN | 102474539 A | 5/2012 |

OTHER PUBLICATIONS

Swype Forums ( http://forum.swype.com/archive/index.php/f-16-p-3.html.) Available by Aug. 5, 2012.*

(Continued)

*Primary Examiner* — William Bashore
*Assistant Examiner* — Nathan Shrewsbury
(74) *Attorney, Agent, or Firm* — Shumaker & Sieffert, P.A.

(57) ABSTRACT

Aspects of the present disclosure are directed to techniques for outputting a graphical keyboard comprising a group of keys, wherein each key in the group of keys is associated with a respective, different display region, receiving an indication of a gesture to select a sequence of keys that are each included in the group of keys of the graphical keyboard, determining that the selected sequence of keys corresponds to a character string that is identifiable by at least one format source, wherein the format source is associated with a syntax, determining, based at least in part on the syntax, that at least one separator character is associated with the character string, and in response to determining that the at least one separator character is associated with the character string, outputting the character string and the at least one separator character at a location proximal to the character string.

20 Claims, 6 Drawing Sheets

(51) Int. Cl.
*G06F 3/023* (2006.01)
*G06F 3/0488* (2013.01)

(56) References Cited

U.S. PATENT DOCUMENTS

| | | | |
|---|---|---|---|
| 6,286,064 B1 | 9/2001 | King et al. | |
| 6,292,179 B1 | 9/2001 | Lee | |
| 6,307,548 B1* | 10/2001 | Flinchem | G06F 3/0237 |
| | | | 341/22 |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,382,358 B2* | 6/2008 | Kushler | G06F 3/0237 |
| | | | 345/168 |
| 7,453,439 B1 | 11/2008 | Kushler et al. | |
| 7,508,324 B2 | 3/2009 | Suraqui | |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |
| 7,921,361 B2 | 4/2011 | Gunn et al. | |
| 8,036,878 B2 | 10/2011 | Assadollahi | |
| 8,059,101 B2 | 11/2011 | Westerman et al. | |
| 8,135,582 B2 | 3/2012 | Suraqui | |
| 8,547,337 B2 | 10/2013 | Yoon | |
| 2004/0138881 A1* | 7/2004 | Divay | G06F 17/2725 |
| | | | 704/231 |
| 2004/0140956 A1* | 7/2004 | Kushler et al. | 345/168 |
| 2006/0119582 A1 | 6/2006 | Ng et al. | |
| 2006/0176283 A1 | 8/2006 | Suraqui | |
| 2006/0265648 A1* | 11/2006 | Rainisto et al. | 715/534 |
| 2007/0040813 A1* | 2/2007 | Kushler et al. | 345/173 |
| 2008/0270896 A1* | 10/2008 | Kristensson | 715/261 |
| 2008/0316183 A1 | 12/2008 | Westerman et al. | |
| 2009/0077501 A1* | 3/2009 | Partridge | G06F 3/017 |
| | | | 715/846 |
| 2010/0121638 A1* | 5/2010 | Pinson | G10L 15/02 |
| | | | 704/235 |
| 2010/0125594 A1* | 5/2010 | Li et al. | 707/758 |
| 2010/0223055 A1* | 9/2010 | Mclean | H04M 1/72552 |
| | | | 704/235 |
| 2010/0235780 A1* | 9/2010 | Westerman et al. | 715/797 |
| 2011/0122081 A1* | 5/2011 | Kushler | 345/173 |
| 2011/0316800 A1 | 12/2011 | Chacho | |
| 2012/0029910 A1* | 2/2012 | Medlock et al. | 704/9 |
| 2012/0036469 A1 | 2/2012 | Suraqui | |
| 2012/0127082 A1 | 5/2012 | Kushler et al. | |
| 2012/0127083 A1* | 5/2012 | Kushler et al. | 345/169 |
| 2012/0203544 A1* | 8/2012 | Kushler | 704/9 |
| 2013/0002556 A1* | 1/2013 | Griffin | 345/168 |
| 2014/0002341 A1* | 1/2014 | Nister et al. | 345/156 |
| 2014/0047394 A1* | 2/2014 | Kushler | 715/856 |
| 2014/0351741 A1* | 11/2014 | Medlock | G06F 17/276 |
| | | | 715/773 |

OTHER PUBLICATIONS

Geese, "Context-aware Keyboard," Retrieved from https://ideasproject.com/idea/-/ideas/12457, accessed on Jul. 17, 2012, 2 pp.
Blackburn, "iPhone's keyboard: A quick-change artist," Watching Apple, Retrieved from watchingapple.com/2007/06/iphones-keyboard-a-quick-change-artist/, accessed on Jun. 26, 2012, 2 pp.
Matt, iPhone's disappearing spacebar—(37 Signals), Retrieved from http://37signals.com/svn/posts/492-iphones-disappearing-spacebar, accessed on Jul. 17, 2012, 9 pp.
International Search Report and Written Opinion of corresponding international application No. PCT/US2013/064131, dated Feb. 10, 2014, 11 pp.
Karch et al., "Typing, Copy, and Search," Android Tablets Made Simple: For Motorola Xoom, Samsung Galaxy Tab, Asus, Toshiba and Other Tablets, Nov. 18, 2011, Chapter 3, 25 pp.
International Preliminary Report on Patentability from International Application No. PCT/US2013/064131, mailed Apr. 30, 2015, 8 pp.
First Office Action, and translation thereof, from counterpart Chinese Patent Application No. 201380053782.9, dated Sep. 27, 2016, 24 pp.

* cited by examiner

CONTEXTUALLY-SPECIFIC AUTOMATIC SEPARATORS

CROSS-REFERENCE TO RELATED APPLICATION

This application claims the benefit of U.S. Provisional Application No. 61/714,682, filed Oct. 16, 2012, which is hereby expressly incorporated by reference in its entirety.

BACKGROUND

Computing devices (e.g., mobile phones, tablet computers, etc.) may provide a graphical keyboard as part of a graphical user interface (GUI) for composing text using a presence-sensitive display. For instance, a presence-sensitive display of a computing device may output a graphical (or "soft") keyboard that permits the user to enter data by selecting (e.g., by tapping or gesturing over) keys displayed at the presence-sensitive display. The graphical keyboard may thus enable a user of the computing device to compose and edit text included in, for example, an e-mail, a text message, a document, etc.

In some cases, the computing device may present a continuous gesture graphical keyboard with which the user interacts by essentially drawing a word to be input to the computing device by sliding his or her finger over the regions associated with the keys of the keyboard. In other words, the user may input an entire word in a single gesture by tracing over the letters of the word. In this way, continuous gesture graphical keyboards provide an input method that allows the user to enter a word or group of words with a gesture. As such, a continuous gesture graphical keyboard may allow the user to achieve greater input efficiency compared to, for example, methods involving one-handed tapping of the display.

However, some continuous gesture graphical keyboards have certain drawbacks. For example, some such keyboards may automatically insert a space character in response to detecting that a user has finished a gesture. In some examples, this space character may be unnecessary or result in an incorrect input value once automatically inserted into a character string. Consequently, the user may be required to correct a character string in certain circumstances where the automatically-inserted space character is unnecessary. As such, automatic insertions of space characters may reduce the speed at which the user may interact with the computing device.

SUMMARY

In general, the disclosure relates to methods including outputting, by a computing device and for display at a presence-sensitive display, a graphical keyboard comprising a group of keys, wherein each key in the group of keys is associated with a respective, different region of the presence-sensitive display, receiving, at the computing device, an indication of a gesture to select a sequence of keys that are each included in the group of keys of the graphical keyboard, determining, by the computing device, that the selected sequence of keys corresponds to a character string that is identifiable by at least one format source, wherein the format source is associated with a syntax, determining, by the computing device and based at least in part on the syntax, that at least one separator character is associated with the character string, and in response to determining that the at least one separator character is associated with the character string, outputting, by the computing device and for display at the presence-sensitive display, the character string and the at least one separator character at a location proximal to the character string.

The disclosure also relates to computer-readable storage medium encoded with instructions that, when executed, cause one or more processors of a computing device to perform operations including, outputting, by the computing device and for display at a presence-sensitive display, a graphical keyboard comprising a group of keys, wherein each key in the group of keys is associated with a respective, different region of a presence-sensitive display, receiving, at the computing device, an indication of a gesture to select a sequence of keys that are each included in the group of keys of the graphical keyboard, determining, by the computing device, that the selected sequence of keys corresponds to a character string that is identifiable by at least one format source, wherein the format source is associated with a syntax, determining, by the computing device and based at least in part on the syntax, that at least one separator character is associated with the character string, and in response to determining that the separator character is associated with the character string, outputting the character string and the at least one separator character at a location proximal to the character string.

The disclosure is also related to computing devices that include at least one processor, a presence-sensitive display operatively coupled to the at least one processor, a gesture module operable by the at least one processor to output for display at a presence-sensitive display operatively coupled to the device, a graphical keyboard comprising a group of keys, wherein each key in the group of keys is associated with a respective, different region of the presence-sensitive display, receive an indication of a gesture to select a sequence of keys that are each included in the group of keys of the graphical keyboard, determine that the selected sequence of keys corresponds to a character string that is identifiable by at least one format source, wherein the format source is associated with a syntax, determine, by the computing device and based at least in part on the syntax, that at least one separator character is associated with the character string, and output the character string and the at least one separator character at a location proximal to the character string in response to determining that the separator character is associated with the character string.

The details of several embodiments of the invention are set forth in the accompanying drawings and the descriptions below. Other features, objects, and advantages of the invention will be apparent from the description and drawings, and from the claims.

DETAILED DESCRIPTION

In general, this disclosure is directed to techniques for improving user interactions with a presence-sensitive display when a user is interacting with an application that allows text input. Such techniques may allow the computing device to determine and automatically insert separator characters in text displayed by a presence-sensitive display. A presence-sensitive display (e.g., a touch-sensitive screen) may enable a user to interact with a computing device by detecting user inputs in the form of gestures performed at or near the presence-sensitive display. In some examples, a user may enter a sequence of characters, indicated by a gesture, that correspond to a particular syntax. The computing device may determine the syntax, for example, a Uniform Resource Locator (URL) syntax, based on a format source. Based on the syntax, the computing device may determine at least one separator character that is associated with the entered sequence of characters, and may output the at least one separator character at a location proximal to the sequence of characters.

Techniques of this disclosure may improve the ease of entering strings of characters, including words, lines, or sentences, by automatically outputting for display the at least one separator character. The outputting of the at least one separator character may increase the accuracy of data entered by the user, for example, by ensuring that the separator characters conform to a specific format, such as the URL format described above. Additionally, the insertion of the at least one separator character may also ease character entry of a user, by eliminating or reducing the need for the user to enter the at least one separator character. As an example, the techniques of this disclosure may automatically output separator characters of a URL, such as a slash ("/") character, which may not be easily accessible to a user of a graphical keyboard. In this way, techniques of the disclosure may provide for input field-dependent selection of separator characters.

A computing device may output the separator characters responsive to determining that a separator character is associated with an inputted character string. In this manner, the techniques of this disclosure may reduce or eliminate the need for a user of the computing device to manually enter separator characters. In some examples, the user may also input a gesture that selects a specific key. Responsive to detecting the input of the specific key of the gesture, the computing device may output the at least one separator character.

Figure 1:
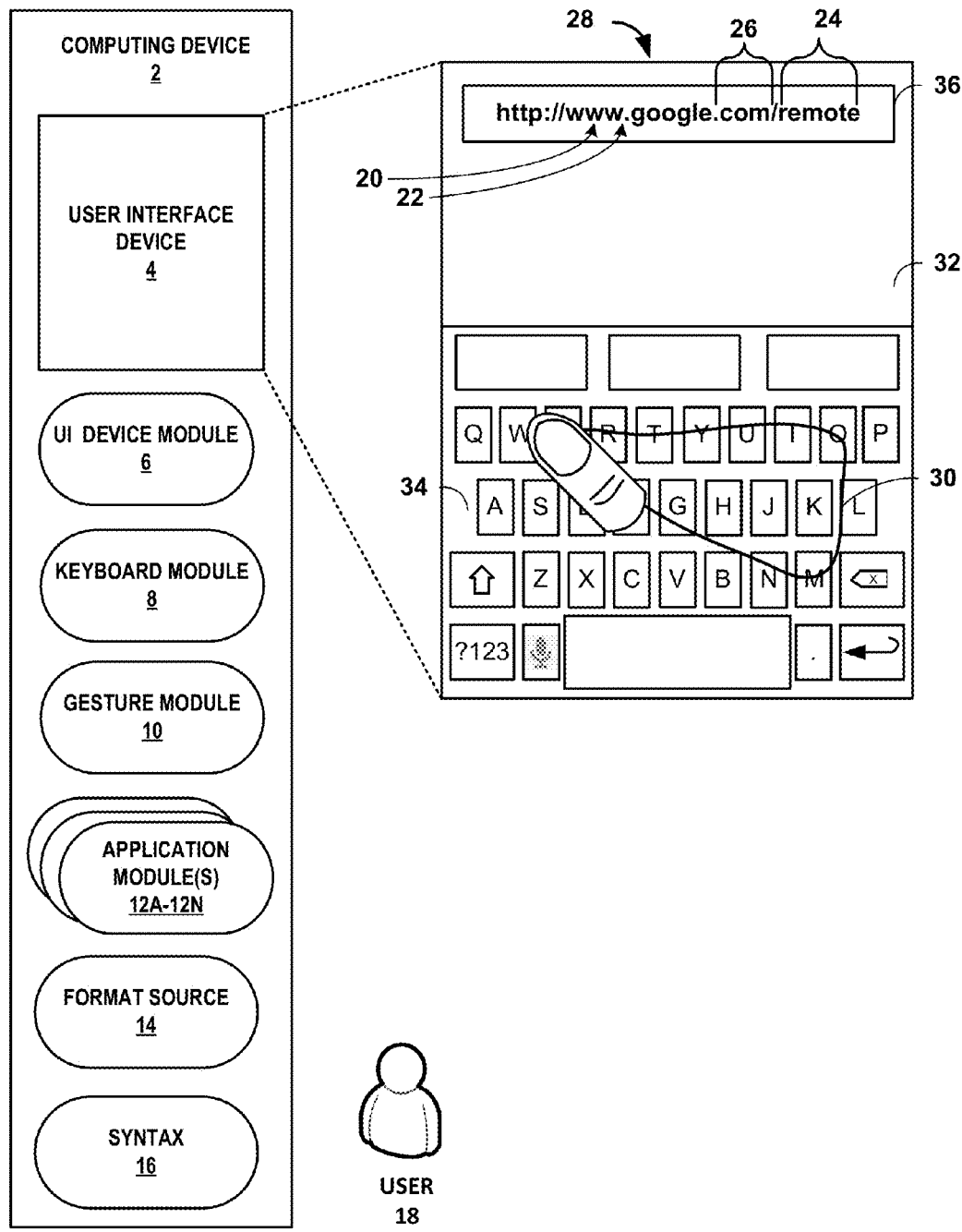
FIG. 1 is a block diagram illustrating an example computing device that may be used to receive a gesture and output at least one separator character at a location proximal to the character string, in accordance with the techniques of this disclosure.

FIG. 1 is a block diagram illustrating an example computing device 2 that may automatically insert at least one separator characters, in accordance with one or more techniques of the present disclosure. Examples of computing device 2 may include, but are not limited to, portable or mobile devices such as mobile phones (including smart phones), laptop computers, desktop computers, tablet computers, smart television platforms, personal digital assistants (PDAs), servers, mainframes, etc. As shown in the example of FIG. 1, computing device 2 may be a smartphone. Computing device 2, in some examples, can include a user interface (UI) device 4, UI device module 6, keyboard module 8, gesture module 10, application modules 12A-12N, format source 14, and syntax 16. Other examples of computing device 2 that implement techniques of this disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive screen, mouse, keyboard, voice responsive system, microphone, camera or any other device for receiving input or any other type of device for receiving input. For example, UI device 4 may detect the presence of an input unit (e.g., finger, stylus, etc.) of user 18 performing a gesture 30 at a presence-sensitive display of UI device 4. UI device 4 may output for display content such as graphical user interface (GUI) 28. GUI 28 may include text display region 32, graphical keyboard 34, etc.

As shown in FIG. 1, computing device 2 may include UI device module 6. UI device module 6 may perform one or more functions to receive input, such as user input or network data, and send such input to other components associated with computing device 2, such as gesture module 10. UI device module 6 may also receive data from components associated with computing device 2, such as keyboard module 8 and application modules 12A-12N. Using the data, UI device module 6 may cause other components associated with computing device 2, such as UI device 4, to provide output based on the data. For instance, UI device module 6 may receive data from gesture module 10, and may cause UI device 4 to display GUI 28 based on such data. In some examples, UI device module 6 may include functionality associated with one or more applications executable by computing device 2, such as one or more of a word-processing application, text messaging application, spreadsheet, web browser, server application, or other applications.

As shown in FIG. 1, GUI 28 may be an interface generated by UI device module 6 and/or one or more of application modules 12A-12N that allows user 18 to interact with computing device 2. GUI 28 may include graphical content. Graphical content, generally, may be any visually displayable graphical object of a graphical user interface. Examples of graphical content may include text, images, a group of moving images, hyperlink, animation, video, characters of a character set etc.

As shown in FIG. 1, UI device module 6 may cause UI device 4 (e.g., a presence-sensitive display) to output GUI 28. GUI 28 may include text display region 32, and graphical keyboard 34. UI device module 6 may output characters for display, e.g., at input field 36, such as characters selected during operation of a typing, word-processing, texting, or other character-based application. Such characters may include words and numbers in a variety of languages, as well as symbols, figures, lines, graphical images etc. Graphical keyboard 34 may display keys associated with characters and/or symbols. User 18 can enter graphical content at text display region 32 by gesturing at graphical keyboard 34 to select keys associated with characters and/or symbols.

Computing device 2, in some examples, includes keyboard module 8. Keyboard module 8 may include functionality to receive and/or process input data received at a graphical keyboard. For example, keyboard module 8 may receive data (e.g., indications) representing inputs of certain keystrokes, gestures, etc., from UI device module 6 that were inputted by user 18 as tap gestures and/or continuous swiping gestures at UI device 4 via a displayed graphical keyboard. Keyboard module 8 may process the received keystrokes to determine intended characters, character strings, words, phrases, etc., based on received input locations, input duration, or other suitable factors. Keyboard module 8 may also function to send character, word, and/or character string data to other components associated with computing device 2, such as application modules 12. That is, keyboard module 8 may, in various examples, receive raw input data from UI device module 6, process the raw input data to obtain text data, and provide the data to application modules 12. For instance, a user (e.g., user 18) may perform a swipe gesture at a presence-sensitive display of computing device 2 (e.g., UI device 4). When performing the swipe gesture, user 18's finger may continuously traverse over or near one or more keys of a graphical keyboard displayed at UI device 4 without user 18 removing her finger from detection at UI device 4. UI device module 6 may receive an indication of the gesture and determine user 18's intended keystrokes from the swipe gesture. UI device module 6 may then provide one or more locations or keystrokes associated with the detected gesture to keyboard module 8. Keyboard module 8 may interpret the received locations or keystrokes as text input, and provide the text input to one or more components associated with computing device 2 (e.g., one of application modules 12).

As shown in FIG. 1, computing device 2 may also include gesture module 10. In some examples, gesture module 10 may be configured to receive gesture data from UI device module 6 and process the gesture data. For instance, gesture module 10 may receive data indicating a gesture input by a user (e.g., user 18) at UI device 4. Gesture module 10 may determine that the input gesture corresponds to a typing gesture, a cursor movement gesture, a cursor area gesture, or other gesture. In some examples, gesture module 10 determines one or more alignment points that correspond to locations of UI device 4 that are touched or otherwise detected in response to a user gesture. In some examples, gesture module 10 can determine one or more features associated with a gesture, such as the Euclidean distance between two alignment points, the length of a gesture path, the direction of a gesture, the curvature of a gesture path, the shape of the gesture, and maximum curvature of a gesture between alignment points, speed of the gesture, etc. Gesture module 10 may send processed data to other components associated with computing device 2, such as application modules 12.

Techniques of the present disclosure may improve the text entry experience of a user, e.g., user 18, when using a gesture keyboard. For example, responsive to receiving an indication of a gesture at UI device 4, which includes a selection of one or more keys of graphical keyboard 34, gesture module 10 may interpret the gesture. In general, gesture module 10 may interpret the gesture to determine whether a received gesture corresponds to a sequence of keys, e.g., a character string or word, or whether the gesture is associated with another operation to be performed by a component of computing device 2. As an example of another operation, gesture module 10 may identify whether a received gesture is associated with a zooming or scrolling action in a document.

In the case where gesture module 10 identifies gesture 30 as a selection of a sequence of keys of graphical keyboard 34, gesture module 10 may determine a word or character string based on the one or more points or locations of UI device 4 that are traversed by gesture 30. In some examples, gesture module 10 may utilize one or more format sources, e.g., format source 14, to determine the character string or word associated with gesture 30. Format source 14 may include one or more dictionaries, lexicons, regular expressions or other repositories of strings, words, phrases, and/or numbers. In some examples, one or more syntaxes, such as syntax 16, may be associated with strings, words, phrases, and/or numbers included in format sources, such as format source 14.

Gesture module 10 may determine that at least one separator character is associated with a character string or a portion of the character string that corresponds to the selected keys of gesture 30. In some examples, to determine whether the at least one separator character is associated with the character string, gesture module 10 may determine that the at least one separator character should be inserted next to the character string. In some examples, gesture module 10 may determine whether the character string is associated with the at least one separator character based on a particular syntax 16 that may be associated with format source 14. For instance, gesture module 10 may determine that an inputted character string is associated with the at least one separator character based on a dictionary, lexicon, regular expression, or a cloud service, any of which may comprise syntax 16. Generally, syntax 16 may be set of rules that define combinations of symbols, characters, etc., that are structurally valid in a given context. For example, a syntax for a phone number may include a set of rules that define a structurally valid phone number as including an international calling prefix, a three digit area code, a three digit exchange code, and a four digit local code. Similarly, a syntax for a Uniform Resource Locator (URL) may include a set of rules that define a structurally valid URL. Despite being shown as being internal to computing device 2, syntax 16 may also be external (e.g., a cloud service), for the purposes of illustration. Further examples of syntax 16 are described below with respect to FIG. 3.

If gesture module determines that at least one separator character is associated with the character string based on syntax 16, user interface device 4 may output the at least one separator character for display at a presence sensitive display using user interface device 4. For instance, as one example of the techniques of this disclosure, user 18 may perform gesture 30 at UI device 4. User 18 may enter gesture 30 at the region of UI device 4 that outputs graphical keyboard 34. In response to data received from UI device module 6 corresponding to gesture 30, gesture module 10 may determine a selected group of keys of graphical keyboard 34, each key being associated with a character. Gesture module 10 may determine the characters associated with the selected keys correspond to "wwwgooglecom". Based on the selected characters, UI device module 6 may output a character string 20 including "www" at input field 36. Input field 36 may be a URL entry input field of application module 12A, which may be a web browser application.

In this first example, gesture module 10 may determine that the entered character string 20 includes characters "www". Gesture module 10 may determine that the string "www" is included in format source 14. In response to determining that "www" is included in format source 14, gesture module 10 may determine that "www" is associated with syntax 16. Syntax 16 may be a syntax that includes one or more rules that define a valid URL. A rule of syntax 16 may specify that a separator character "." is appended to the character string "www" in a URL. Consequently, gesture module 10 may send data to UI device module 6 that causes UI device 4 to automatically append a "." separator character 22 to "www" in input field 36.

Gesture 30 may also traverse keys of graphical keyboard 34 to select character string "googlecom" that is included in "wwwgooglecom". Gesture module 10 may determine that a substring "com" of the character string "googlecom" is included in format source 14. In response, gesture module 10 may determine, based on format source 14, that "com" is associated with syntax 16. Syntax 16 may include a rule that specifies a "." separator character is prepended to the character string "com" in a URL. Another rule in syntax 16 may specify that a "/" separator character is appended to "com". Consequently, gesture module 10 may send data to UI device module 6 that causes UI device 4 to output a "." separator character before "com" in input field 36 and a "/" separator character after "com" in input field 36.

In an alternative example, gesture 30 may traverse keys of graphical keyboard 34 to select character string "wwwgooglecomremote". As described above, gesture module 10 may send data to UI device module 6, based on syntax 16, to prepend a "." separator character to "com" and append a "/" separator character to "com". However, syntax 16 may further include a rule that a "/" character is further appended to each substring included in "wwwgooglecomremote" that is dictionary word and follows the character string "com". For example, gesture module 10 may determine that substring "remote" is included in character string "wwwgooglecomremote" and follows the character string "com". Consequently, gesture module 10 may send data to UI device module 6 that causes UI device 4 to append a "/" separator character to "remote" in input field 36. In this way, user 18 may provide a single gesture to select "wwwgooglecomremote" which gesture module 10 may cause UI device 4 to output in input field 36 as "www.google.com/remote/".

As described above with respect to FIG. 1, techniques of the present disclosure may modify the behavior of a gesture keyboard such that a separator character applied to a character string is field dependent. That is, in some examples, an application can specify that a field should contain a valid URL or phone number. Using techniques of the disclosure, computing device 2 can adapt inputted characters accordingly to automatically insert separator characters based on a syntax. In this way, computing device 2 can insert at least one separator character before, between, or after characters that are inputted with a gesture.

Figure 3:
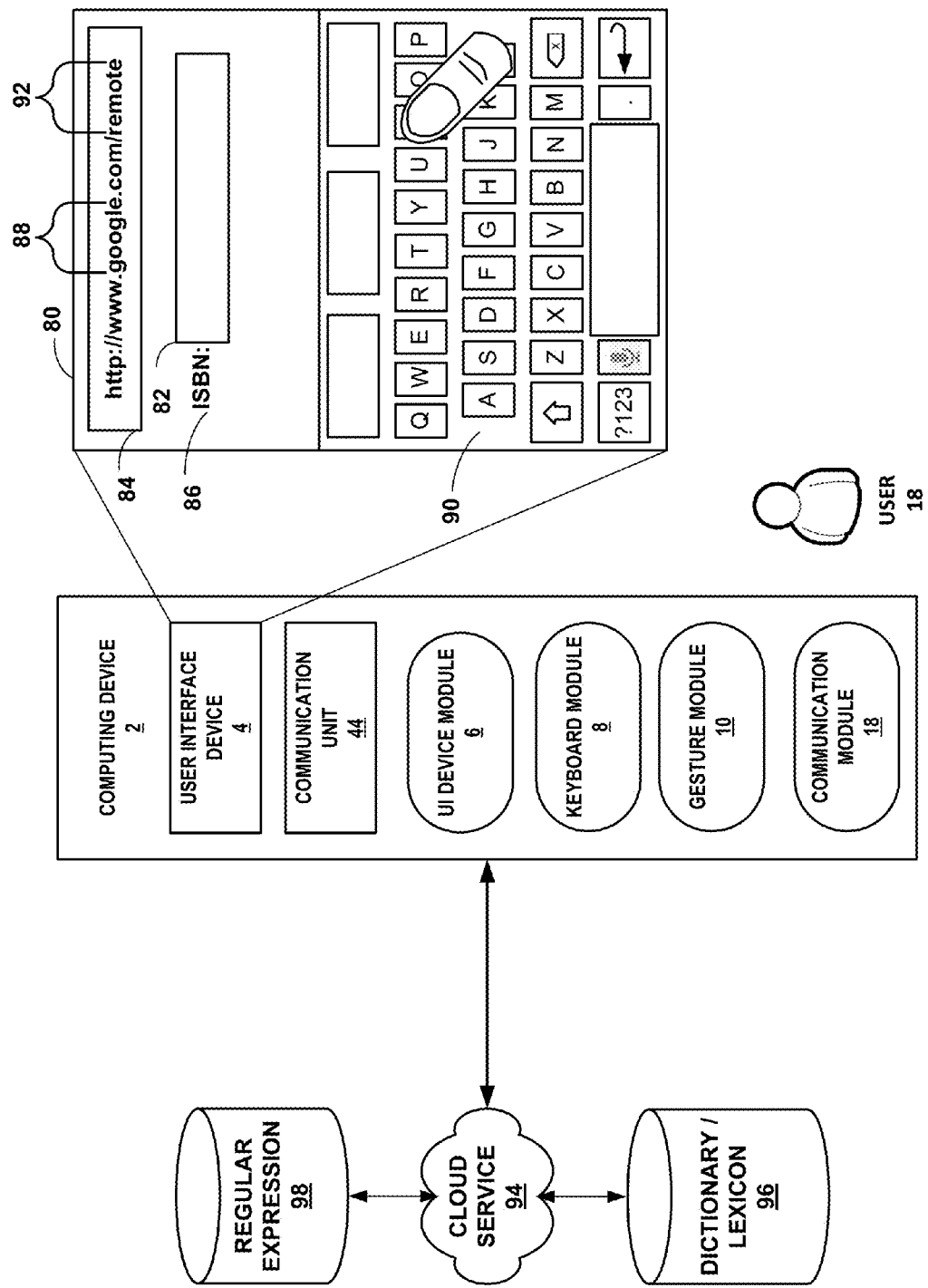
FIG. 3 is a block diagram illustrating an example computing device that may be configured to receive a gesture and output at least one separator character at a location proximal to the character string, in accordance with the techniques of this disclosure.
Figure 4:
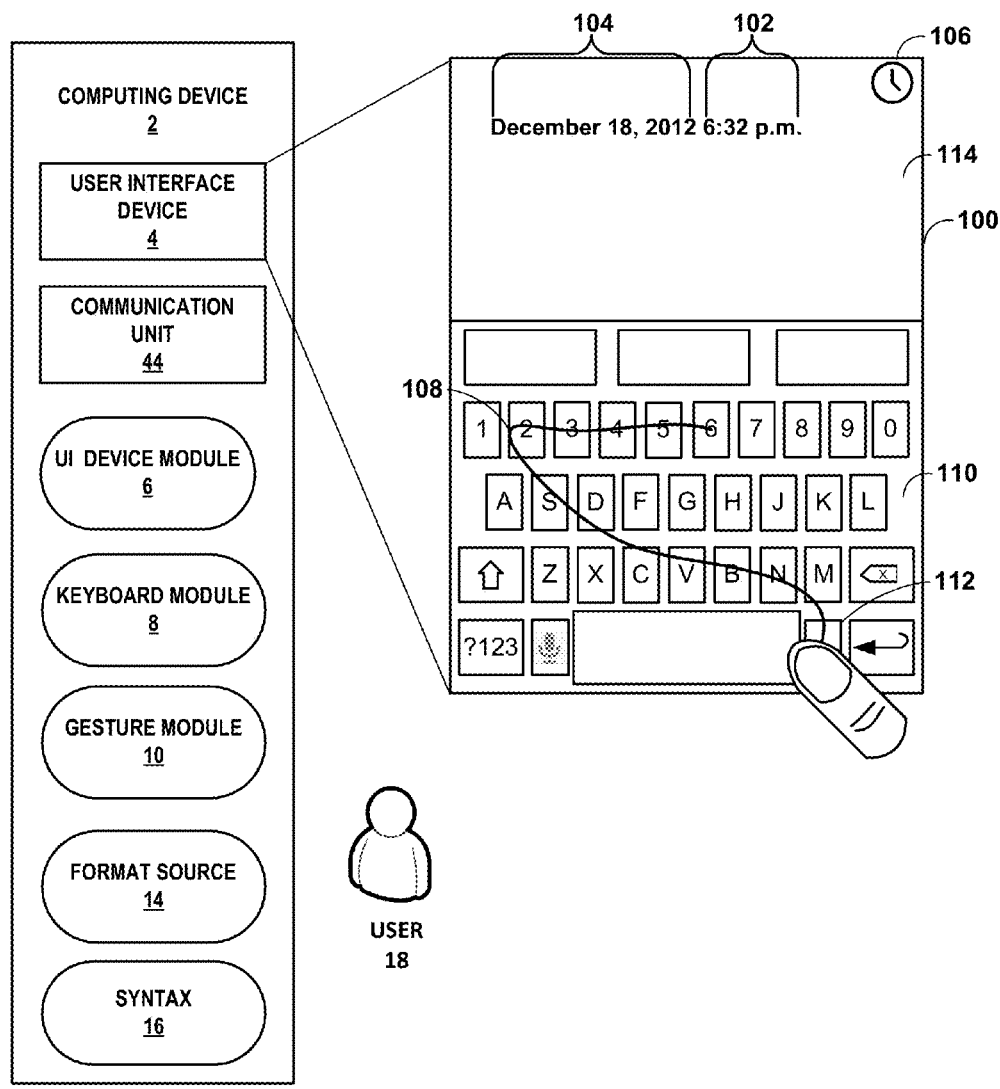
FIG. 4 is a block diagram illustrating an example computing device that may be configured to receive a gesture and output at least one separator character at a location proximal to the character string, in accordance with the techniques of this disclosure.

Although illustrated in FIG. 1 with respect to a URL input field, techniques of the disclosure are not limited to URL fields. Rather, techniques of the disclosure more generally apply to any other formatted text. As further described herein, gesture module 10 may determine any number of different "text classes" that correspond to different types of data that may be received at an input field. Each text class may correspond to a different syntax that is identifiable using a format source as generally described in FIG. 1. In one example, gesture module 10 may take one or a combination of the text field description and context (text enter such as http://, www. "the url is:") to determine which one the classes (e.g., syntaxes) should be used as default by gesture module 10 when inserting separator characters. FIGS. 3 and 4 illustrate example techniques to apply separator characters in the context of dates and times. In other examples, gesture module 10 may use a syntax corresponding to name honorifics to automatically enter a "." separator character after a character string such as "Mr" or "Ms" is entered by a user.

Figure 2:
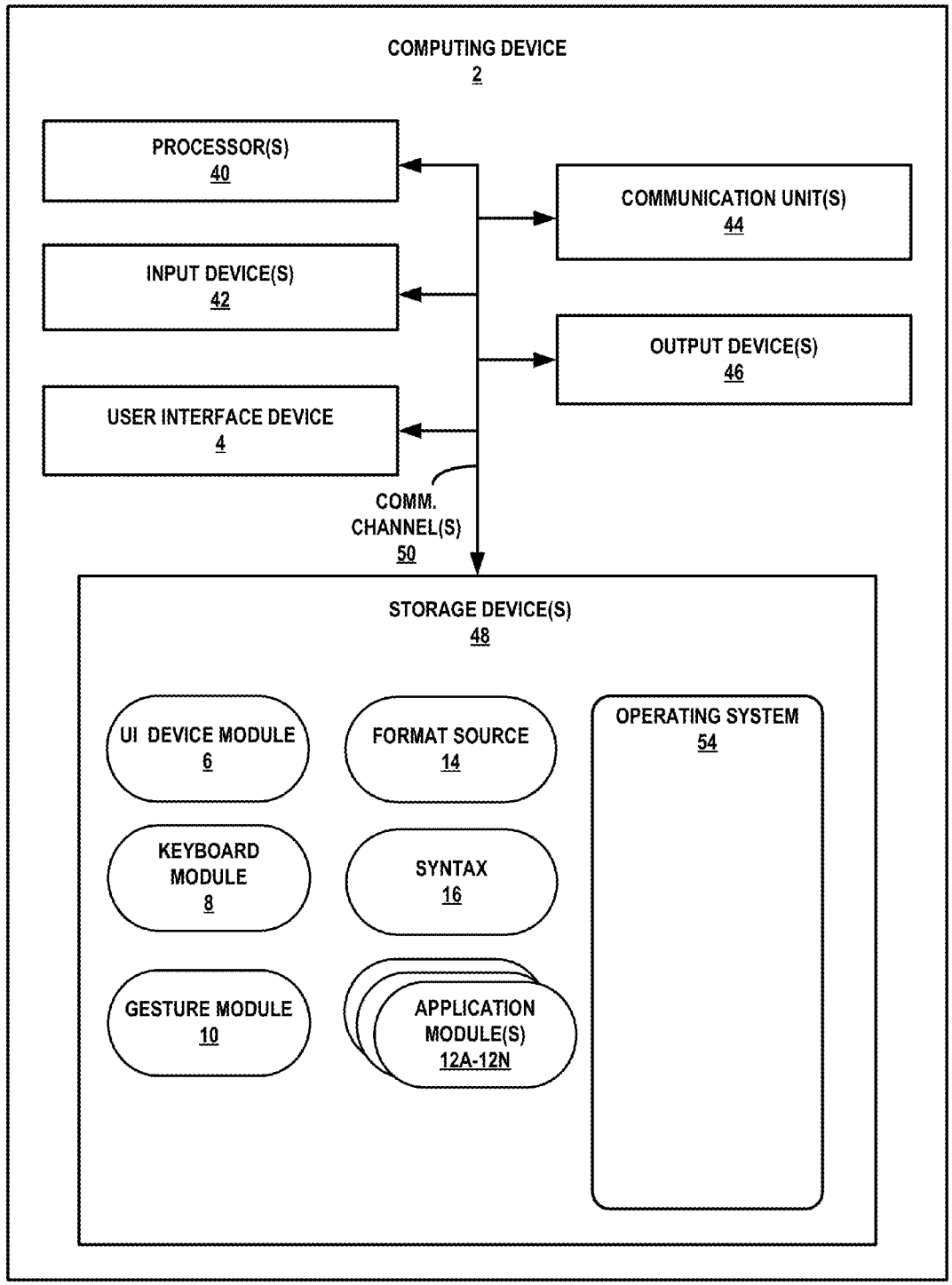
FIG. 2 is a block diagram illustrating further details of one example of a computing device shown in FIG. 1, in accordance with one or more aspects of the present disclosure.

FIG. 2 is a block diagram illustrating further details of one example of a computing device shown in FIG. 1, in accordance with one or more aspects of the present disclosure.

FIG. 2 illustrates only one particular example of computing device 2, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Storage devices 48, in one example, further include UI device module 6, keyboard module 8, gesture module 10, application module 12A-12N, format source 14, and operating system 54. Each of components 40, 42, 44, 46, and 48 may be interconnected (physically, communicatively, and/or operatively) for inter-component communications. In some examples, communication channels 50 may include a system bus, network connection, interprocess communication data structure, or any other channel for communicating data. As one example in FIG. 2, components 40, 42, 44, 46, and 48 may be coupled by one or more communication channels 50. UI device module 6, keyboard module 8, gesture module 10, application module 12A-12N, format source 14, and operating system 54 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., applications modules 12) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and Wi-Fi radios computing devices as well as Universal Serial Bus (USB). In some examples, computing device 2 utilizes communication unit 44 to wirelessly communicate with an external device such as computing devices 4 of FIG. 1, or any other computing device.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

Computing device 2 may also include one or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 4 may be a touch-sensitive screen.

Computing device 2 may include operating system 54. Operating system 54, in some examples, controls the operation of components of computing device 2. For example, operating system 54, in one example, facilitates the communication of UI device module 6, keyboard module 8, gesture module 10, application modules 12A-12N (application modules 12), format source 14, and syntax 16 with processors 40, communication unit 44, storage device 48, input device 42, and output device 46. Application modules 12 may each include program instructions and/or data that are executable by computing device 2. As one example, UI device module 6, keyboard module 8, gesture module 10, format source 14, and syntax 16 may include instructions that cause computing device 2 to perform one or more of the operations and actions described in the present disclosure.

In accordance with techniques of the disclosure, UI device module 6 may initially cause UI device 4 to display a graphical user interface (GUI) 28 that includes graphical objects. For instance, GUI 28 includes graphical keyboard 34 and text display region 32, as shown in FIG. 1. In accordance with techniques of the disclosure, user 18 (FIG. 1) may perform a touch gesture at a location of UI device 4 that displays input field 36. UI device 4 may detect the touch gesture and, in response, gesture module 8 may determine a character string that corresponds to the gesture. Computing device 2 may determine if a syntax 16 is associated with the character string based on format source 14. If the syntax is associated with the character string, UI device module 6 may determine at least one separator character that is associated with the character string, and may output the character string at a location proximal to the character string.

In some examples, syntax 16 and format source 14 may have a particular structure, such as a tree or hash table structure. Syntax 16 may also comprise at least one of a grammar and a lexicon. Syntax 16 and source 14 may also be stored in or more of a database or a flat file. Based at least in part on a character string that gesture module 8 determines based on a detected gesture, application module 12A may attempt to identify at least one format source, e.g., format source 14. The format source is associated with a syntax, e.g., syntax 16. Based on syntax 16, application module 12A may determine at least one separator character for output to input field 36.

As an example, user input device 4 may detect a gesture, and gesture module may determine a character string, e.g., "wwwgooglecom", based on the detected gesture. Application module 12A may utilize the character string, for example by using regular expressions or substring matching, to determine that the character string is identifiable by at least one format source, e.g., format source 14. In this example, the fact that the character string includes the substrings "www" and "com" may identify the character string to format source 14, as these strings may indicate that the character string is related to a URL. Syntax 16 is associated with format source 14, and may include a regular expression, grammar or lexicon that may indicate the separator characters, e.g., a period ("."), that UI device 4 inserts in between "www" and "google", and in between "google" and "com" at text field 36.

In some examples, a user may provide a gesture at graphical keyboard 32 to input the character string "lifeatgoogle". Gesture module 10 may parse "lifeatgoogle", using a dictionary or lexicon, to determine that substrings "life", "at", and "google" are included in the dictionary or lexicon. Upon detecting one or more dictionary words included in the character string "lifeatgoogle", gesture module 10 may insert at least one separator character proximal to each substring based on syntax 16. For example, if syntax 16 includes one or more rules to define a valid URL, gesture module 10 may suppress automatic space insertion (e.g., not output a space automatically after each word) and rather append a "/" separator character to each of the substrings. In this way, a continuous gesture to select these words would result in a valid URL.

In another alternative example, gesture module 10 may provide one or more field-specific adaptations. For example, an input field may be configured to receive a URL. It may be more common for URLs that to start with "w" to start with "www" than other words in a dictionary. In one example, gesture module 10 may determine a gesture selects a key associated with the character "w". Gesture module 10 may further determine that the input field for which the "w" key was selected is a URL input field and/or that syntax 16 is associated with a URL syntax. Consequently, gesture module 10 may, based on syntax 16, send data to UI device module 6 that causes UI device 4 to output "www" in response to determining that the user has selected the key associated with "w". In other words, gesture module 10 may determine a plurality of characters to output at UI device 4, based at least in part on syntax 16 and the selected key. In this way, gesture module 10 can complete the portion of the URL with "www." based on the gesture to select "w". As described in the current example, gesture module 10 could further select a separator character "." that is appended to "www" based on syntax 16. In the case that the user wants to actually enter a different word that starts with a "w", they could backspace over the automatically entered text and enter a different string.

In some examples, rather than or in addition to detecting the type of data (e.g., URL) that the user is entering by an indication from the application, gesture module 10 may also use prefix cues. For example, a user that performs a gesture to enter the character string "http:" may be typing a URL. In response to determining that "http:" is associated with syntax 16, based at least in part on format source 14, gesture module 10 may switch to a "URL-entering mode" until the user explicitly taps a space key. That is, in some examples, gesture module 10 may determine syntax 16 based at least in part on format source 14 and the character string "http:" and may continue to apply syntax 16 to subsequent characters and/or character strings associated with one or more gestures until a terminating gesture is identified by gesture module 10 and/or until a terminating key and/or character is identified by gesture module 10.

In some examples, gesture module 10 may provide techniques that allow common URL symbols such as "." and "/" in the gesture itself. For example, the following two gestures may select characters corresponding to URL specific text. In some examples, gesture module 10 may also automatically activate a syntax corresponding to a URL, although the field does not specify the URL type. For example, gesture module 10 may determine a gesture that selects "http/". Gesture module 10, using syntax 16, may send data to UI device module 6 that causes UI device 4 to output "http://". That is, syntax 16, may include one or more rules that correspond to one or more specific symbols, e.g., "/". In response to determining the symbol, e.g., "/", based on syntax 16, gesture module 10 may determine one or more associated specific symbols or characters indicated in syntax 16 that correspond to "/". Gesture module 10 may send data to UI device module 6 that causes UI device 4 to output the one or more associated specific symbols or characters, based on the rules in syntax 16. As another example, gesture module 10 may determine, based on syntax 16, that a specific group of symbols and characters "www." are associated with a gesture from "w"→".". Consequently, in response to determining the gesture from "w"→".", gesture module 10 may send data to UI device module 6 that causes UI device 4 to output "www.".

In another example, gesture module 10 may refrain from inserting a separator character to a character string based on syntax 16. For example, syntax 16 may include a rule that refrains from inserting a separator character unless the gesture ends with a specific symbol and/or character. For example, gesture module 10 may generate the text "about/" for display in response to a gesture that includes "about"→"/". In accordance with techniques of the disclosure, gesture module 10 may generate the text "life" for display in response to a gesture that includes "life" but does not include a "/" symbol because the gesture did not include "/". In some examples, gesture module 10, in response to receiving an indication of a terminating gesture or a selection of a terminator key (e.g., the backspace key) may refrain from automatically outputting a separator character. For instance, in response to determining the user has selected the backspace key, gesture module 10 may refrain from automatically inserting the separator character "/" although gesture module 10 is using syntax 16 based on format source 14.

In some examples, gesture module 10 may not have a sufficient amount of text in an inputted character string to determine which syntax to use until after a user 18 has inputted threshold quantity of text. In such examples, gesture module 10 may not may not automatically enter separator characters until a threshold quantity have text has been received by gesture module 10. In response to determining a threshold quantity of text has been inputted, gesture module 10 may select a corresponding syntax. In response to selecting the syntax, gesture module 10 may determine a previously entered portion of the character string and insert a separator character, based on the syntax, proximal to the previously entered portion of the character string. As one example, a user may provide a gesture to enter the character "http", which may not include a threshold quantity of text. Gesture module 10 may therefore not select a syntax until a threshold quantity of text is entered. For instance, the user may subsequently enter which "www" in which case gesture module 10 may determine that a threshold quantity of text has been entered (e.g., a quantity of characters greater than a 4 characters). Any suitable threshold quantity of text may be used by gesture module 10. In response to determining that a threshold quantity of text has been entered, gesture module 10 may insert the separator characters "://" proximal (e.g., between) previously entered character strings "http" and "www".

In some examples, gesture module 10 may generate for display alternative suggestions and/or corrections of words and/or separator characters. In some examples, gesture module 10 may send data to UI device module 6 that causes UI device 4 to output alternative suggestions for different separator characters at one or more different locations proximal to a character string. In some examples, the user may select from one or more alternative separator characters outputted for display at UI device 4. In some examples, the alternative separator characters may be ordered based at least in part on probabilities of separator characters as the separator characters correspond to the character string and syntax 16. In one example, where a space character is a separator character and in response to determining an entered string "lifeatgoogle", gesture module 10 may send data that causes UI device 4 to output "life at Google" at an alternative location of the graphical user interface such as a suggestion bar. In response to receiving an indication that the user has selected the character string "life at Google" gesture module 10 may send data that causes UI device 4 to output "life at Google" at text display region 32. One or more statistical techniques, such as probabilistic ranking, may be used by gesture module 10 to select the separators characters that are output for display in the suggestion bar. For instance, separator characters may occur at differing frequencies within a character string for a given syntax. Gesture module 10 may determine the differing frequencies (e.g., number of occurrences) of the separator characters within the syntax and output the separator characters at different locations of the graphical user interface or in a determined order based on the frequencies. More generally, gesture module 10 may use online or offline learning to identify a given context from a group of contexts. In such examples, if gesture module determines a given context or field description (e.g., an input field in a web browser) is most frequently followed by gesture module 10 using a given syntax, then gesture module 10 will use the given syntax as the default syntax subsequent text entry contexts where an input field is included in a web browser.

FIG. 3 is a block diagram illustrating an example computing device that may be configured to receive an indication of a gesture and output at least one separator character at a location proximal to the character string, in accordance with the techniques of this disclosure.

As described above with respect to FIG. 1, computing device 2 includes UI device 4, UI device module 6, keyboard module 8, and gesture module 10. As illustrated in FIG. 2, computing device 2 may also include communication unit 44. Communication module 10 may control and/or interface with communication unit 44.

User interface device 4 may output GUI 80 which may include a graphical keyboard 90, and user interface elements 82, 84, 86. User interface device 4 may output for display a graphical keyboard 90 using keyboard module 8, as similarly described in FIG. 1. In accordance with the techniques of this disclosure, graphical keyboard 90 may comprise a gesture keyboard, and user 18 may input a gesture of one or more characters using graphical keyboard 90 of GUI 80. Responsive to receiving a gesture from user 18, gesture module 10 may determine a character string based on a sequence of characters selected with the gesture input.

Computing device 2 may determine whether a syntax is associated with the character string based on a format source. In an example, communication module 18 may send a request message to a remote service, such as cloud service 94, for a format source. Cloud service 94 may be an Internet-based service provided by one or more remote computing devices (e.g., servers) that is capable of receiving requests for format source using a variety of different protocols, such as JavaScript object notation (JSON), simple object access protocol (SOAP), Transmission Control/Internet Protocol (TCP/IP), Universal Datagram Protocol (UDP), HyperText Transfer Protocol (HTTP) or any other Internet-compatible protocol compatible with the techniques of this disclosure. Communication module 18 may receive a reply message from the cloud service that includes the format source. In some examples, computing device 2 may store the received format source for repeated or later use on storage devices 48. The format source may also be associated with a syntax. In alternative examples, computing device 2 may query a format source provided by cloud service 94 rather than receiving the entire format source from cloud service 94. In this way, computing device 2 may send requests to one or more cloud services to query format sources without storing each format source at computing device 2.

In some examples, the format source may comprise one or more regular expressions. A regular expression may provide one or more techniques to match strings of text, such as particular characters, words, or patterns of characters. Computing device 2 may apply the regular expression to the character string to determine if the regular expression matches the character pattern specified by the regular expression by determining whether the character string matches the character pattern specified by the regular expression. In some examples, computing device 2 may utilize a regular expression library to attempt to match the character string associated with the gesture to a value included in or associated with a format source.

The format source that cloud service 94 transmits to computing device 2 may also comprise at least one of a dictionary or lexicon. For example, lexicon 96 may comprise a reference list of words, character strings, and/or numbers. In some examples, computing device 2 may index into lexicon 96 using a key, which may be the character string associated with the inputted gesture. The value that computing device 2 may obtain from lexicon 96 may indicate a particular syntax that is associated with the key. If there is a syntax associated with the key of the dictionary and lexicon 96, computing device 2 may determine at least one separator character that is associated with the inputted character string, and may output the at least one separator character at a location proximal to the character string. In some examples, to determine whether the at least one separator character is associated with the character string, computing device 2 may determine that the at least one separator character should be inserted next to the character string.

Although illustrated as being external to computing device 2, regular expression 98 and lexicon 96 may also be internal to computing device 2. As an example, computing device 2 may store regular expression 98 and lexicon 96 on storage devices 48, as shown in FIG. 2.

Computing device 2 may also determine a syntax for a character string based on information associated with a graphical element of an application, such as user interface element 86. In the example of FIG. 3, input field 84, may be an input field that user 18 may display any text inputted by user 18 within the border of input field 84.

If computing device 2 determines that the inputted character string is associated with a syntax, user interface device module 6 may output the at least one separator character at a location proximal to the character string. In an example, user interface device 4 may output the at least one separator character by prepending the at least one separator characters to the character string. As an example, user 18 may enter a gesture corresponding to the character string "google" 88. Computing device 2 may determine a format source, syntax, and the separator character ".", based on the string "google" that follows "www". User interface device 4 may append "." to "www" before outputting the character string "google".

In another example, computing device 2 may output the at least one separator character by appending the at least one separator character to the character string. As an example, user 18 may enter a gesture corresponding to the character string "google" 88. Computing device 2 may determine a format source, syntax, and the separator characters "." And "/", based on the string "com" in accordance with the techniques of this disclosure. User interface device 4 may prepend the separator characters "." to "com" and append the separator character "/" to "com" when outputting to the character string "com".

Computing device 2 may also output different separator characters based on a syntax. As an example, gesture module 10 may receive an indication of a first gesture that selects a first sequence of keys, which may correspond to a character string, e.g., the character string "google" 88 in FIG. 3. Gesture module 10 may determine a format source and a syntax associated with the character string, e.g., a URL syntax. Computing device 2 may determine that a first at least one separator character, such as the string of characters ".com" is associated with the character string "google" 88, and user interface device 4 may output the at least one separator character. Gesture module 2 may also receive an indication of a second gesture selecting a second sequence of keys that may comprise a character string, e.g., the character string "remote" 92, that is identified using a second format source in a plurality of format sources. Based at least in part on the syntax, computing device 2 may determine based at least in part on the syntax and by the computing device, that a second at least one separator character, e.g., "/" is associated with the second character string, and in response to determining that the second at least one separator character is associated with the second character string may output the second character string ("remote") and the second separator character ("/") at a location proximal (e.g., before) the second character string.

Computing device 2 may determine a format source and a syntax associated with the format source based on syntax information associated with input field 82. In the example of FIG. 3, the information associated with input field 82 may include text information that may indicate a syntax of input field 82. For instance, input field 82 is associated with the text "ISBN". The text "ISBN" may be a property of UI element 86, a label associated with UI element 86, an identifier of UI element 86, etc. In any case, based on UI element 86, computing device 2 may determine that UI element 86 has a syntax associated with an International Standard Book Number (ISBN). Responsive to receiving a character string, such as a series of numbers, mobile computing device 2 may output at least one separator character, such as one or more dashes of the ISBN at a location proximal to the character string, based on the determined syntax.

FIG. 4 is a block diagram illustrating an example computing device that may be configured to receive a gesture and output at least one separator character at a location proximal to the character string, in accordance with the techniques of this disclosure.

As described above with respect to FIG. 1, computing device 2 in FIG. 4 includes UI device 4, UI device module 6, keyboard module 8, and gesture module 10. User interface device 4 may output GUI 100, which may include a graphical keyboard 110, and user interface elements 102, 104, and 106. User interface device 4 may output for display a graphical keyboard 110 based on data generated by keyboard module 8. Graphical keyboard region 110 may comprise a gesture keyboard that allows a user to input a gesture that selects a sequence of one or more characters. In accordance with the techniques of this disclosure, user 18 may input a gesture 108 to select one or more characters using graphical keyboard 110 of GUI 100. Responsive to receiving gesture 108 from user 18, gesture module 10 may determine a character string based on a sequence of characters selected with the gesture input and output the at least one separator character in accordance with the techniques of this disclosure.

In an example, gesture module 10 may output the at least one separator character based on whether a gesture includes a macro key. In particular, computing device 2 may determine whether gesture 108 includes a macro key, such as macro key 112. A macro key 112 may be a specific key of graphical keyboard 110 that causes gesture module 10 to output the at least one separator character. Accordingly, responsive to determining that gesture 108 includes macro key 112, computing device 2 may output the at least one separator character at a location proximal to the character string.

As described above, computing device 2 may determine syntax 16 associated with a character string based on format source 14. In some examples, syntax 16 may include one or more of a URL syntax, a date syntax, and a time syntax. Computing device 2 may utilize the URL syntax, for example, when user 18 inputs a character string of a URL. The URL syntax may include a set of separator characters that are typically associated with a URL. Examples of the URL separator characters may include one or more of: a slash character ("/"), ".com", a period character ("."), and "www.", as some non-limiting examples.

The date syntax may include a set of separator characters associated with a date. FIG. 4 illustrates a sample character string that represents a date 104, and which may include separator characters, such as a comma in between the day of the month, and the year of the character string.

The time syntax may include a set of separator characters associated with a time of day. In FIG. 4, a time syntax may be associated with a string of characters that indicate a time of day, e.g., "6:32 p.m." 102. When a user enters a gesture to input a time of day, e.g., "632 pm", syntax 16 may send information that causes user interface device 4 to output separator characters, such as a colon, a space (e.g., in between the minutes and "a.m." or "p.m."), one or more periods (e.g., in "a.m." or "p.m."), as some non-limiting examples, based on the time syntax.

User interface device 4 may also output a graphical indication of a currently selected syntax based on a particular syntax that is associated with a character string associated with a gesture. Example graphical indications may include adding and removing an icon associated with the syntax to GUI 100 when the syntax is used, changing the color of at least some portion of GUI 100 (e.g., keys of graphical keyboard 110, border of GUI 100, etc.), changing the style of at least some portion of GUI 100 (e.g., border weight, background of text display region 114, etc.), etc. In FIG. 4, user interface element 106 may be an example indication that computing device 2 has determined or selected a time syntax. The appearance of UI element 106 may change, for example, when user 18 inputs a different gesture that may have a different associated syntax, such as a URL syntax. In some examples, computing device 2 may receive an input, such as a selection, from user 18 that selects a UI element, such as user interface element 106. The input may indicate or specify a different syntax. As an example, user 18 may select UI element 106 to change syntax 16 from a date syntax to a time syntax. Accordingly, any separator characters that computing device 2 may associate and output based on the changed syntax may also change according to the change in syntax.

Computing device 2 may also receive an indication of a user input to select a value that corresponds to a setting that may control whether computing device 2 outputs a separator character. User 18 may modify the setting, for example, using a settings dialog that includes various settings for graphical keyboard region 108. In some examples, keyboard module 8 may receive the value of the setting, and output the at least one separator character based on the value of the setting.

Computing device 2 may also output different separator characters based on text that user 18 has previously inputted. That is, gesture module 10 may determine a syntax based on previously inputted text. As an example, in FIG. 4, user 18 may have already inputted the date, "Dec. 18, 2012" 104. User 18 may then input gesture 108, which may correspond to the character string "632". Based on the inputted character string, and date 104, gesture module 10 may determine that a time syntax is associated with the character string of gesture 108, as well as at least one separator character. User interface device 4 may output the at least one separator character (e.g., a colon (":")) based on the determined time syntax associated with the character string.

Figure 5:
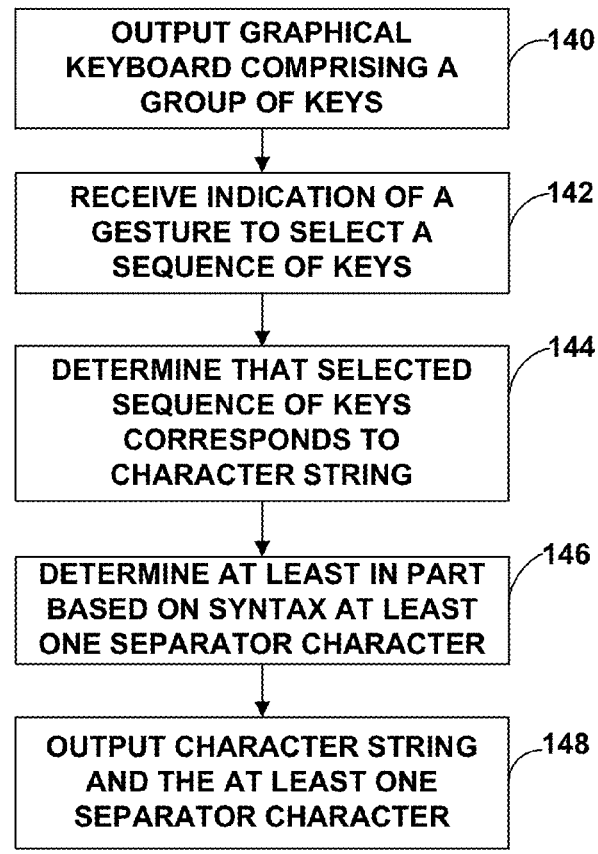
FIG. 5 is a flow diagram illustrating example operations of a computing device to determine and output at least one separator character, in accordance with one or more techniques of the present disclosure.

FIG. 5 is a flowchart illustrating example operations of a computing device configured to output separator based on a syntax associated with an inputted character string, in accordance with one or more techniques of the present disclosure. For purposes of illustration only, the example operations are described below within the context of computing device 2, as shown in FIGS. 1, 2, 3, and 4.

In the example of FIG. 5, computing device 2 may output a graphical keyboard comprising a group of keys. Each key in the group of keys may be associated with a respective, different region of the presence-sensitive display (140).

Computing device 2 may receive an indication of a gesture to select a sequence of keys that are each included in the group of keys of the graphical keyboard (142). Computing device 2 may determine that the selected sequence of keys corresponds to a character string that is identifiable by at least one format source, and the format source may be associated with a syntax (144). Computing device 2 may determine based at least in part on the syntax and by the computing device that at least one separator character is associated with the character string (146). In some examples, to determine whether the at least one separator character is associated with the character string, computing device 2 may determine that the at least one separator character should be inserted next to the character string. In response to determining that the at least one separator character is associated with the character string, computing device 2 may output the character string and the at least one separator character at a location proximal to the character string (148).

In one example, the at least one separator character may be a first separator character, the location may be a first location, and the format source may be a first format included in a plurality of format sources. Computing device 2 may receive an indication of a second gesture to select a second sequence of keys that are each included in the group of keys of the graphical keyboard. Computing device 2 may determine that the second selected sequence of keys corresponds to a second character string that is identified using a second format source in the plurality of format sources. Computing device 2 may determine based at least in part on the syntax and by the computing device, that a second separator character is associated with the second character string, and in response to determining that the second separator character is associated with the second character string, output the second character string and the second separator character at a second location proximal to the second character string.

In an example, outputting the at least one separator character at the location proximal to the character string may comprise determining whether the gesture selects a macro key, and responsive to determining that the gesture selects the macro key, outputting, by the computing device and for display at the presence-sensitive display, the at least one separator character at a location proximal to the character string. In another example, determining that the selected sequence of keys may correspond to the character string that is identified using the format source may comprise: sending, by computing device 2, a request message to a remote service for data associated with a format source, receiving, by computing device 2, a reply message from the remote service that includes the data associated with the format source, wherein the format source is associated with the syntax. In some examples, the data associated with the format source included in the reply message from the remote service may comprise a regular expression, and the syntax may comprise a character pattern specified by the regular expression. The operations may also further comprise: applying, by computing device 2, the regular expression to the character string to determine whether the character string matches the character pattern specified by the regular expression and determining, based at least in part on the syntax that the at least one separator character is associated with the character string further comprises: determining, by computing device 2, whether the character string matches the character pattern specified by the regular expression.

In an example, outputting the at least one separator character at a location proximal to the character string further may comprise appending the at least one separator character to the character string. In another example, outputting the at least one separator character at a location proximal to the character string may further comprise prepending the at least one separator character to the character string.

In another example, the syntax may comprises at least one of: a Uniform Resource Locator (URL) syntax, wherein the URL syntax includes a set of separator characters associated with a URL, a date syntax, wherein the date syntax includes a set of separator characters associated with a date, and a time syntax, wherein the time syntax includes a set of separator characters associated with a time of day. In the case where the syntax comprises the URL syntax, the at least one separator character may include at least one of: ".com", a slash ("/") character, a period character ("."), and "www.".

In another example, the operations of FIG. 5 may further include receiving, by computing device 2, an indication of a user input to select a value that corresponds to a user setting, and outputting the at least one separator character may comprise outputting the at least one separator character based on the value that corresponds to the user setting.

In yet another example, the character string may be a first character string and the syntax may be a first syntax. The operations illustrated in FIG. 5 may further include receiving, by computing device 2, a second character string, determining, by computing device 2, based on the second character string, a second syntax, wherein the second syntax comprises at least one character pattern, wherein determining that the second selected sequence of keys corresponds to a second character string that is identifiable using the format source may comprise: determining, by computing device 2, whether the second character string matches the character pattern.

In yet another example, the format source may comprise at least one of a dictionary and a lexicon. In another example, the operations of FIG. 5 may further include determining, by computing device 2, syntax information associated with a user interface element of an application of the computing device, and determining, by computing device 2, the format source and the syntax associated with the format source based at least in part on the syntax information associated with the user interface element. In another example, the operations of FIG. 5 may further include, in response to determining the syntax, outputting, by computing device 2 and for display at the presence-sensitive display, a graphical indication of the syntax.

In another example, the syntax may be a first syntax, and the operations of FIG. 5 may further include receiving, at computing device 2, an indication of a second syntax, and changing, by the computing device, the first syntax to a second syntax responsive to receiving the indication of the second syntax. In yet another example, the format source may comprise a regular expression, and the syntax may be a character pattern specified by the regular expression. The operations of FIG. 5 may further include: applying, by computing device 2, the regular expression to the character string to determine whether the character string matches the character pattern specified by the regular expression, wherein determining, based at least in part on the syntax that the at least one separator character is associated with the character string may further include: determining, by computing device 2, whether the character string matches the character pattern specified by the regular expression.

Figure 6:
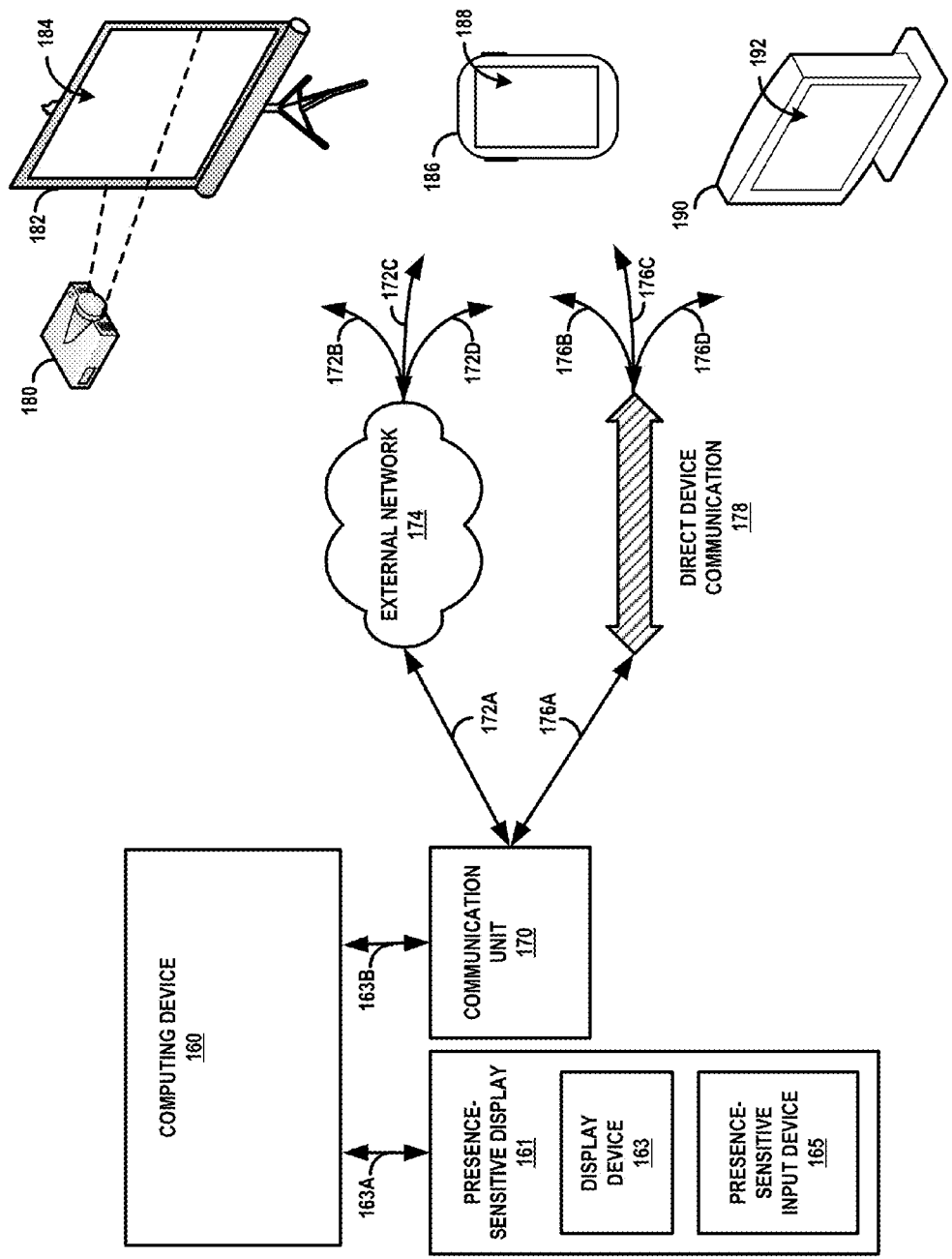
FIG. 6 is a block diagram illustrating an example computing device that outputs graphical content for display at a remote device, in accordance with one or more techniques of the present disclosure

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 160, presence-sensitive display 161, communication unit 170, projector 180, projector screen 182, tablet device 186, and visual display device 190. Although computing device 2 is shown for purposes of example in FIGS. 1-3 as a stand-alone computing device, a computing device, such as computing device 2 and computing device 160 may, generally, be any component or system that includes a processor or other suitable computing environment for executing software instructions and, for example, need not include a presence-sensitive display.

As shown in the example of FIG. 6, computing device 160 may be a processor that includes functionality as described with respect to processor 40 in FIG. 2. In such examples, computing device 160 may be operatively coupled to presence-sensitive display 161 by a communication channel 163A, which may be a system bus or other suitable connection. Computing device 160 may also be operatively coupled to communication unit 170, further described below, by a communication channel 163B, which may also be a system bus or other suitable connection. Although shown separately as an example in FIG. 6, computing device 160 may be operatively coupled to presence-sensitive display 161 and communication unit 170 by any number of one or more communication channels.

In other examples, such as illustrated previously in FIGS. 1-2, computing device 2 and computing device 160 may be a portable or mobile device such as mobile phones (including smart phones), laptop computers, etc. In some examples, computing device 160 may be a desktop computers, tablet computers, smart television platforms, cameras, personal digital assistants (PDAs), servers, mainframes, etc.

Presence-sensitive display 161, as shown in FIG. 1, may include display device 163 and presence-sensitive input device 165. Display device 163 may, for example, receive data from computing device 100 and display the graphical content. In some examples, presence-sensitive input device 165 may determine one or more user inputs (e.g., continuous gestures, multi-touch gestures, single-touch gestures, etc.) at presence-sensitive display 161 using capacitive, inductive, and/or optical recognition techniques and send indications of such user input to computing device 160 using communication channel 163A. In some examples, presence-sensitive input device 165 may be physically positioned on top of display device 163 such that, when a user positions an input unit over a graphical element displayed by display device 163, the location at which presence-sensitive input device 165 corresponds to the location of display device 163 at which the graphical element is displayed.

As shown in FIG. 6, computing device 160 may also include and/or be operatively coupled with communication unit 170. Communication unit 170 may include functionality of communication unit 44 as described in FIG. 2. Examples of communication unit 170 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 160 may also include and/or be operatively coupled with one or more other devices, e.g., input devices, output devices, memory, storage devices, etc. that are not shown in FIG. 6 for purposes of brevity and illustration.

FIG. 6 also illustrates a projector 180 and projector screen 182. Other such examples of projection devices may include electronic whiteboards, holographic display devices, and any other suitable devices for displaying graphical content. Projector 180 and project screen 182 may include one or more communication units that enable the respective devices to communicate with computing device 160. In some examples, the one or more communication units may enable communication between projector 180 and projector screen 182. Projector 180 may receive data from computing device 160 that includes graphical content. Projector 180, in response to receiving the data, may project the graphical content onto projector screen 182. In some examples, projector 180 may determine one or more user inputs (e.g., continuous gestures, multi-touch gestures, single-touch gestures, etc.) at projector screen using optical recognition or other suitable techniques and send indications of such user input using one or more communication units to computing device 160.

Projector screen 182, in some examples, may include a presence-sensitive display 184. Presence-sensitive display 184 may include a subset of functionality or all of the functionality of UI device 4 as described in this disclosure. In some examples, presence-sensitive display 184 may include additional functionality. Projector screen 182 (e.g., an electronic whiteboard), may receive data from computing device 160 and display the graphical content. In some examples, presence-sensitive display 184 may determine one or more user inputs (e.g., continuous gestures, multi-touch gestures, single-touch gestures, etc.) at projector screen 182 using capacitive, inductive, and/or optical recognition techniques and send indications of such user input using one or more communication units to computing device 160.

FIG. 6 also illustrates tablet device 186 and visual display device 190. Tablet device 186 and visual display device 190 may each include computing and connectivity capabilities. Examples of tablet device 186 may include e-reader devices, convertible notebook devices, hybrid slate devices, etc. Examples of visual display device 190 may include televisions, computer monitors, etc. As shown in FIG. 6, tablet device 186 may include a presence-sensitive display 188. Visual display device 190 may include a presence-sensitive display 192. Presence-sensitive displays 188, 192 may include a subset of functionality or all of the functionality of UI device 4 as described in this disclosure. In some examples, presence-sensitive displays 188, 192 may include additional functionality. In any case, presence-sensitive display 192, for example, may receive data from computing device 160 and display the graphical content. In some examples, presence-sensitive display 192 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 160.

As described above, in some examples, computing device 160 may output graphical content for display at presence-sensitive display 161 that is coupled to computing device 160 by a system bus or other suitable communication channel. Computing device 160 may also output graphical content for display at one or more remote devices, such as projector 180, projector screen 182, tablet device 186, and visual display device 190. For instance, computing device 160 may execute one or more instructions to generate and/or modify graphical content in accordance with techniques of the present disclosure. Computing device 160 may output the data that includes the graphical content to a communication unit of computing device 160, such as communication unit 170. Communication unit 170 may send the data to one or more of the remote devices, such as projector 180, projector screen 182, tablet device 186, and/or visual display device 190. In this way, computing device 160 may output the graphical content for display at one or more of the remote devices. In some examples, one or more of the remote devices may output the graphical content at a presence-sensitive display that is included in and/or operatively coupled to the respective remote devices.

In some examples, computing device 160 may not output graphical content at presence-sensitive display 161 that is operatively coupled to computing device 160. In other examples, computing device 160 may output graphical content for display at both a presence-sensitive display 161 that is coupled to computing device 160 by communication channel 163A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 160 and output for display at presence-sensitive display 161 may be different than graphical content display output for display at one or more remote devices.

Computing device 160 may send and receive data using any suitable communication techniques. For example, computing device 160 may be operatively coupled to external network 174 using network link 172A. Each of the remote devices illustrated in FIG. 6 may be operatively coupled to network external network 174 by one of respective network links 172B, 172C, and 172D. External network 174 may include network hubs, network switches, network routers, etc., that are operatively inter-coupled thereby providing for the exchange of information between computing device 160 and the remote devices illustrated in FIG. 6. In some examples, network links 172A-172D may be Ethernet, ATM or other network connections. Such connections may be wireless and/or wired connections.

In some examples, computing device 160 may be operatively coupled to one or more of the remote devices included in FIG. 6 using direct device communication 178. Direct device communication 178 may include communications through which computing device 160 sends and receives data directly with a remote device, using wired or wireless communication. That is, in some examples of direct device communication 178, data sent by computing device 160 may not be forwarded by one or more additional devices before being received at the remote device, and vice-versa. Examples of direct device communication 178 may include Bluetooth, Near-Field Communication, Universal Serial Bus, WiFi, infrared, etc. One or more of the remote devices illustrated in FIG. 6 may be operatively coupled with computing device 160 by communication links 176A-176D. In some examples, communication links 172A-172D may be connections using Bluetooth, Near-Field Communication, Universal Serial Bus, infrared, etc. Such connections may be wireless and/or wired connections.

In accordance with the techniques of this disclosure, computing device 160 may be operatively coupled to visual display 190 using external network 174. Computing device 160 may output a graphical keyboard comprising a group of keys for display at presence-sensitive display 192. Each key in the group of keys is associated with a different region of presence-sensitive display 192. For instance, computing device 160 may send data that includes a representation of the graphical keyboard to communication unit 170. Communication unit 170 may send the data that includes the representation of the graphical keyboard to visual display device 190 using external network 174. Visual display device 190, in response to receiving the data using external network 174, may cause presence-sensitive display 192 to output the graphical keyboard.

Responsive to receiving an indication of a gesture to select a sequence of keys that are each included in the group of keys of the graphical keyboard, visual display device 190 may transmit the indication of the gesture to computing device 160 using external network 174. Computing device 160 may determine that the selected sequence of keys corresponds to a character string that is identifiable by at least one format source, wherein the format source is associated with a syntax. Computing device 160 may determine based at least in part on the syntax that at least one separator character is associated with the character string. In some examples, to determine whether the at least one separator character is associated with the character string, computing device 160 may determine that the at least one separator character should be inserted next to the character string.

In response to determining that the at least one separator character is associated with the character string, computing device 160 transmit the character string and at least one separator for output to communication unit 170. Communication unit 170 may transmit the character string and the at least one separator character for output at presence-sensitive screen using external network 174. Presence-sensitive screen 192 may output the character string and the at least one separator character at a location proximal to the character string.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   outputting, by a computing device and for display at a presence-sensitive display, a graphical user interface associated with an application executing at the computing device, the graphical user interface comprising an input field and a graphical keyboard, the graphical keyboard comprising a group of keys, wherein each key in the group of keys is associated with a respective, different region of the presence-sensitive display;
   receiving, at the computing device, an indication of a gesture to select a sequence of keys that are each included in the group of keys of the graphical keyboard;
   determining, by the computing device, that the selected sequence of keys corresponds to a character string that is identifiable by a format source, wherein the format source is associated with a syntax, the format source and the syntax being determined based on syntax information associated with the input field;
   determining, by the computing device and based at least in part on the syntax, that at least one separator character is associated with the character string, wherein the gesture does not indicate a key associated with the at least one separator character, and wherein the syntax comprises a set of rules that define one or more combinations of symbols or characters that are structurally valid in a given context defined as the input field; and
   in response to determining that the at least one separator character is associated with the character string for the given context, outputting, by the computing device, for display within the input field, the character string and the at least one separator character between at least two characters of the character string.

2. The method of claim 1, wherein the at least one separator character comprises a first separator character, wherein the location is a first location, wherein the format source is a first format source included in a plurality of format sources, the method further comprising:
   receiving, at the computing device, an indication of a second gesture to select a second sequence of keys that are each included in the group of keys of the graphical keyboard;
   determining, by the computing device, that the second selected sequence of keys corresponds to a second character string that is identified using a second format source of the plurality of format sources;
   determining, by the computing device and based at least in part on the syntax, that a second separator character is associated with the second character string; and
   in response to determining that the second separator character is associated with the second character string, outputting, by the computing device and for display at the presence-sensitive display, the second character string and the second separator character at a second location proximal to the second character string.

3. The method of claim 1, wherein determining that the selected sequence of keys corresponds to the character string that is identified using the format source comprises:
   sending, by the computing device, a request message to a remote service for data associated with the format source;
   receiving, by the computing device, a reply message from the remote service that includes the data associated with the format source.

4. The method of claim 3, wherein the data associated with the format source that is included in the reply message from the remote service comprises a regular expression, wherein the syntax comprises a character pattern specified by the regular expression, the method further comprising:
   applying, by the computing device, the regular expression to the character string to determine whether the character string matches the character pattern specified by the regular expression.

5. The method of claim 2, wherein outputting the at least one separator character at a second location proximal to the character string further comprises appending the at least one separator character to the character string.

6. The method of claim 2, wherein outputting the at least one separator character at a second location proximal to the character string further comprises prepending the at least one separator character to the character string.

7. The method of claim 1, wherein the syntax comprises at least one of:
   a Uniform Resource Locator (URL) syntax, wherein the URL syntax includes a set of separator characters associated with a URL;
   a date syntax, wherein the date syntax includes a set of separator characters associated with a date; and
   a time syntax, wherein the time syntax includes a set of separator characters associated with a time of day.

8. The method of claim 7, wherein the syntax comprises the URL syntax, and wherein the at least one separator character includes at least one of:
   ".com",
   a slash ("/") character,
   a period character ("."),
   and "www.".

9. The method of claim 1, wherein the character string is a first character string and the syntax is a first syntax, the method further comprising:
   receiving, by the computing device, a second character string;
   determining, by the computing device, based on the second character string, a second syntax, wherein the second syntax comprises at least one character pattern, wherein determining that the second selected sequence of keys corresponds to a second character string that is identifiable using the format source comprises:
   determining, by the computing device, whether the second character string matches the at least one character pattern.

10. The method of claim 1, wherein the format source comprises at least one of a dictionary and a lexicon.

11. The method of claim 1, wherein the syntax is a first syntax, the method further comprising:
receiving, at the computing device, an indication of a second syntax; and
changing, by the computing device, the first syntax to a second syntax responsive to receiving the indication of the second syntax.

12. The method of claim 1, wherein the format source comprises a regular expression, wherein the syntax comprises a character pattern specified by the regular expression, the method further comprising:
applying, by the computing device, the regular expression to the character string to determine whether the character string matches the character pattern specified by the regular expression,
wherein determining, based at least in part on the syntax that the at least one separator character is associated with the character string further comprises:
determining, by the computing device, whether the character string matches the character pattern specified by the regular expression.

13. A device comprising:
at least one processor;
a presence a presence-sensitive display; and
a gesture module operable by the at least one processor to:
output, for display at the presence-sensitive display, a graphical user interface associated with an application executing at the at least one processor, the graphical user interface comprising an input field and a graphical keyboard, the graphical keyboard comprising a group of keys, wherein each key in the group of keys is associated with a respective, different region of the presence-sensitive display;
receive an indication of a gesture to select a sequence of keys that are each included in the group of keys of the graphical keyboard;
determine that the selected sequence of keys corresponds to a character string that is identifiable by a format source, wherein the format source is associated with a syntax, the format source and the syntax being determined based on syntax information associated with the input field;
determine, based at least in part on the syntax, that at least one separator character is associated with the character string, wherein the gesture does not indicate a key associated with the at least one separator character, and wherein the syntax comprises a set of rules that define one or more combinations of symbols or characters that are structurally valid in a given context defined as the input field; and
in response to determining that the separator character is associated with the character string for the given context, output, for display within the input field, the character string and the at least one separator character between at least two characters of the character string.

14. The device of claim 13, wherein the at least one separator character comprises a first separator character, wherein the location is a first location, wherein the format source is a first format source included in a plurality of format sources, wherein the gesture module is further operable by the at least one processor to:
receive an indication of a second gesture to select a second sequence of keys that are each included in the group of keys of the graphical keyboard;
determine that the second selected sequence of keys corresponds to a second character string that is identified using a second format source in a plurality of format sources;
determine, based at least in part on the syntax, that a second at least one separator character is associated with the second character string; and
in response to determining that the second separator character is associated with the second character string, output, for display at the presence-sensitive display, the second character string and the second separator character at a second location proximal to the second character string.

15. A non-transitory computer-readable storage medium encoded with instructions that, when executed, cause at least one processor of a computing device to:
output, for display at a presence-sensitive display, a graphical user interface associated with an application executing at the computing device, the graphical user interface comprising an input field and a graphical keyboard, the graphical keyboard comprising a group of keys, wherein each key in the group of keys is associated with a respective, different region of a presence-sensitive display;
receive an indication of a gesture to select a sequence of keys that are each included in the group of keys of the graphical keyboard;
determine that the selected sequence of keys corresponds to a character string that is identifiable by a format source, wherein the format source is associated with a syntax, the format source and the syntax being determined based on syntax information associated with the input field;
determine, based at least in part on the syntax, that at least one separator character is associated with the character string, wherein the gesture does not indicate a key associated with the at least one separator character, and wherein the syntax comprises a set of rules that define one or more combinations of symbols or characters that are structurally valid in a given context defined as the input field; and
in response to determining that the separator character is associated with the character string, output, for display within the input field, the character string and the at least one separator character between at least two characters of the character string.

16. The non-transitory computer-readable medium of claim 15, wherein the at least one separator character comprises a first separator character, wherein the location is a first location, wherein the format source is a first format source included in a plurality of format sources, and wherein the instructions, when executed, further cause the at least one processor to:
receive an indication of a second gesture to select a second sequence of keys that are each included in the group of keys of the graphical keyboard;
determine that the second selected sequence of keys corresponds to a second character string that is identified using a second format source in a plurality of format sources;
determine, based at least in part on the syntax, that a second at least one separator character is associated with the second character string; and
in response to determining that the second at least one separator character is associated with the second character string, output, by the computing device and for display at the presence-sensitive display, the second character string and the second separator character at a second location proximal to the second character string.

17. The method of claim 1, wherein:
the input field is a Uniform Resource Locator input field;
the application is a web browser application; and
the syntax is a Uniform Resource Locator syntax that includes a set of separator characters associated with a Uniform Resource Locator.

18. The method of claim 1, wherein:
the input field is a date or time input field; and
the syntax is a date or time syntax that includes a set of separator characters associated with a date or time.

19. The device of claim 13,
wherein:
the input field is a Uniform Resource Locator input field;
the application is a web browser application; and
the syntax is a Uniform Resource Locator syntax that includes a set of separator characters associated with a Uniform Resource Locator; or wherein:
the input field is a date or time input field; and
the syntax is a date or time syntax that includes a set of separator characters associated with a date or time.

20. The non-transitory computer-readable medium of claim 15,
wherein:
the input field is a Uniform Resource Locator input field;
the application is a web browser application; and
the syntax is a Uniform Resource Locator syntax that includes a set of separator characters associated with a Uniform Resource Locator; or wherein:
the input field is a date or time input field; and
the syntax is a date or time syntax that includes a set of separator characters associated with a date or time.

* * * * *

UNITED STATES PATENT AND TRADEMARK OFFICE
CERTIFICATE OF CORRECTION

PATENT NO. : 9,557,818 B2  
APPLICATION NO. : 13/784507  
DATED : January 31, 2017  
INVENTOR(S) : Shumin Zhai et al.

It is certified that error appears in the above-identified patent and that said Letters Patent is hereby corrected as shown below:

In the Claims

Column 25, Line 26 (Claim 13): "a presence a presence-sensitive display; and" should read --a presence-sensitive display; and--

Signed and Sealed this
Nineteenth Day of December, 2017

Joseph Matal
*Performing the Functions and Duties of the
Under Secretary of Commerce for Intellectual Property and
Director of the United States Patent and Trademark Office*